United States Patent
Lim et al.

(10) Patent No.: US 10,965,362 B2
(45) Date of Patent: Mar. 30, 2021

(54) POSITIONING METHOD BASED ON TIME DIVISION MULTIPLE ACCESS, POSITIONING SYSTEM, AND FRAME STRUCTURE USED THEREIN

(71) Applicant: AJOU UNIVERSITY INDUSTRY-ACADEMIC COOPERATION FOUNDATION, Suwon-si (KR)

(72) Inventors: Jae Sung Lim, Suwon-si (KR); Kyu Man Lee, Suwon-si (KR); Ki Hyoung Kim, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 285 days.

(21) Appl. No.: 16/095,541

(22) PCT Filed: Apr. 21, 2017

(86) PCT No.: PCT/KR2017/004306
§ 371 (c)(1),
(2) Date: Oct. 22, 2018

(87) PCT Pub. No.: WO2017/183947
PCT Pub. Date: Oct. 26, 2017

(65) Prior Publication Data
US 2020/0358520 A1    Nov. 12, 2020

(30) Foreign Application Priority Data
Apr. 22, 2016  (KR) .................. 10-2016-0049462

(51) Int. Cl.
*H04B 7/185* (2006.01)

(52) U.S. Cl.
CPC ....... *H04B 7/18508* (2013.01); *H04B 7/1851* (2013.01); *H04B 7/18547* (2013.01)

(58) Field of Classification Search
CPC ..... H04W 84/06; H04W 88/16; H04W 40/26; H04W 74/0891; H04W 8/08;
(Continued)

(56) References Cited

U.S. PATENT DOCUMENTS

2005/0108374 A1\* 5/2005 Pierzga ............. H04B 7/18504
709/223

FOREIGN PATENT DOCUMENTS

KR    10-2011-0008956 A    1/2011
KR       10-1219467 B1    1/2013

OTHER PUBLICATIONS

Notice of Refusal for KR 10-2016-0049462 dated Sep. 18, 2017.
(Continued)

*Primary Examiner* — Tu X Nguyen
(74) *Attorney, Agent, or Firm* — Sughrue Mion, PLLC

(57) ABSTRACT

A time division multiple access frame structure includes a signal transmission section allocated for transmitting reference signals from a plurality of ground reference stations; a relay section for relaying the transmitted reference signals by a plurality of aeronautical satellite relay stations selected by a central station; and a data transmission section for data transmission of the central station, the plurality of ground reference stations, or the plurality of aeronautical satellite relay stations, wherein the signal transmission section, the relay section, and the data transmission section are time division multiplexed with each other.

8 Claims, 7 Drawing Sheets

(58) Field of Classification Search
CPC ............ H04B 7/18513; H04B 7/18506; H04B 10/118; H04B 7/18517; H04B 7/18534; H04B 7/18504; H04B 7/15542; H04B 7/15592; H04B 7/18521; H04B 7/2046; H04H 20/74

See application file for complete search history.

(56) References Cited

OTHER PUBLICATIONS

Notice of Refusal for KR 10-2016-0049462 dated Jan. 30, 2018.
International Search Report for PCT/KR2017/004306 dated Sep. 1, 2017.

* cited by examiner

POSITIONING METHOD BASED ON TIME DIVISION MULTIPLE ACCESS, POSITIONING SYSTEM, AND FRAME STRUCTURE USED THEREIN

TECHNICAL FIELD

The present invention relates to a positioning method based on a time division multiple access frame, a positioning system, and a frame structure used therein, and more particularly, to a positioning method based on a time division multiple access frame in which a receiving station may receive reference signals relayed by a plurality of aeronautical satellite relay stations selected by a central station and a position of the receiving station may be determined based on the received reference signals, a positioning system, and a frame structure used therein.

The present invention is a research conducted with the support of the Korea Research Foundation as the fund of the government (Future Creation Science Department) in 2016 (2016R1A2A1A05005541).

BACKGROUND ART

Military networks, such as Link-16, are intended for military tactical data exchange, and accurate positioning of moving objects such as aircrafts has a significant impact on the construction of military tactics.

A ground reference point directly transmits a message for positioning to a moving object whose visible ray is guaranteed from the ground reference point, and measures a position of the moving object through a message propagation time.

For a moving object whose visual line is not guaranteed from the ground reference point, positioning is performed by relative navigation based on a moving object whose visible ray is guaranteed, and the moving object whose visual line is guaranteed becomes the origin of relative navigation coordinates and measures a relative position of corresponding military equipment. However, there is a problem that accuracy of the positioning is deteriorated because a moving object to be positioned moves continuously while a time difference occurs between messages transmitted for positioning.

DETAILED DESCRIPTION OF THE INVENTION

Technical Problem

The present invention is directed to a positioning method based on a time division multiple access frame, a positioning system, and a frame structure used therein, and more particularly, to a positioning method based on a time division multiple access frame in which a receiving station may receive reference signals relayed by a plurality of aeronautical satellite relay stations selected by a central station and a position of the receiving station may be determined based on the received reference signals, a positioning system, and a frame structure used therein.

Technical Solution

According to an aspect of the present invention, a time division multiple access frame structure includes a signal transmission section allocated for transmitting reference signals from a plurality of ground reference stations, a relay section for relaying the transmitted reference signals by a plurality of aeronautical satellite relay stations selected by a central station and a data transmission section for data transmission of the central station, the plurality of ground reference stations, or the plurality of aeronautical satellite relay stations, wherein the signal transmission section, the relay section, and the data transmission section are time division multiplexed with each other.

In some embodiments, the signal transmission section may include a central station slot for transmitting information about the plurality of aeronautical satellite relay stations selected by the central station to the ground reference stations and a plurality of reference station slots respectively allocated to the plurality of ground reference stations for respectively transmitting reference signals from the plurality of ground reference stations.

In some embodiments, the relay section may include a plurality of relay station slots respectively allocated to the plurality of aeronautical satellite relay stations selected by the central station for relaying reference signals of the plurality of aeronautical satellite relay stations.

According to another aspect of the present invention, the positioning method based on a time division multiple access frame may further comprise selecting aeronautical satellite relay stations for relaying reference signals transmitted from a plurality of ground reference stations from among a plurality of aeronautical satellite relay station candidates, receiving reference signals that are transmitted from the ground reference stations and relayed by the selected aeronautical satellite relay stations, determining a position of each of the selected aeronautical satellite relay stations using a time difference of the received reference signals and determining a position of a receiving station based on the determined position of each of the aeronautical satellite relay stations and arrival times of the received reference signals, wherein a signal transmission section in which the reference signals are transmitted and a relay section in which the reference signals are relayed are time division multiplexed with each other to form one frame.

In some embodiments, the signal transmission section may comprise a central station slot for transmitting information about the plurality of aeronautical satellite relay stations selected by the central station to the ground reference stations and a plurality of reference station slots respectively allocated to the plurality of ground reference stations for respectively transmitting reference signals from the plurality of ground reference stations.

In some embodiments, the relay section may comprise a plurality of relay station slots respectively allocated to the plurality of aeronautical satellite relay stations selected by the central station for relaying reference signals of the plurality of aeronautical satellite relay stations.

In some embodiments, the selecting of the aeronautical satellite relay stations may comprise selecting the plurality of aeronautical satellite relay stations based on a horizontal distance between a central station and each of the plurality of aeronautical satellite relay station candidates.

In some embodiments, the selecting of the aeronautical satellite relay stations may comprise selecting a first aeronautical satellite relay station having a longest horizontal distance from the central station and a second aeronautical satellite relay station having a shortest horizontal distance from the central station from among the plurality of aeronautical satellite relay station candidates.

In some embodiments, the selecting of the aeronautical satellite relay stations may further comprise selecting aeronautical satellite relay stations with reference to reference points having angles that are integral multiples of a reference angle from a reference line formed by the first aeronautical satellite relay station and the central station.

According to another aspect of the present invention, a positioning system based on a time division multiple access frame may comprise a plurality of ground reference stations respectively transmitting reference signals, a plurality of aeronautical satellite relay stations for relaying the reference signals transmitted from the plurality of ground reference stations, a central station for selecting the plurality of aeronautical satellite relay stations for relaying signals from among a plurality of aeronautical satellite relay station candidates and a receiving station for determining a position of each of the aeronautical satellite relay stations using a time difference of the reference signals that are relayed by the aeronautical satellite relay stations and received, and determining a position of the receiving station based on the determined position of each of the aeronautical satellite relay stations and arrival times of the received reference signals, wherein a signal transmission section in which the reference signals are transmitted and a relay section in which the reference signals are relayed are time division multiplexed with each other to form one frame.

In some embodiments, the signal transmission section may comprise a central station slot for transmitting information about the aeronautical satellite relay stations to the plurality of ground reference stations and a plurality of reference station slots respectively allocated to the plurality of ground reference stations for respectively transmitting reference signals from the plurality of ground reference stations.

In some embodiments, the relay section may comprise a plurality of relay station slots respectively allocated to the aeronautical satellite relay stations for relaying reference signals of the plurality of the aeronautical satellite relay stations.

In some embodiments, the central station may select the aeronautical satellite relay stations based on a horizontal distance between the central station and each of the plurality of aeronautical satellite relay station candidates.

In some embodiments, the central station may select a first aeronautical satellite relay station having a longest horizontal distance from the central station and a second aeronautical satellite relay station having a shortest horizontal distance from the central station from among the plurality of aeronautical satellite relay station candidates.

In some embodiments, the central station may select aeronautical satellite relay stations with reference to reference points having angles that are integral multiples of a reference angle from a reference line formed by the first aeronautical satellite relay station and the central station.

Advantageous Effects of the Invention

According to an embodiment of the present invention, the present invention may improve an accuracy and a reliability of positioning by selecting a plurality of distributed aeronautical satellite relay stations effectively and by determining position of receiving station based on reference signals that are relayed by the selected aeronautical satellite relay station.

Furthermore, according to an embodiment of the present invention, the present invention may constitute frame by allocating slots to a plurality of aeronautical satellite relay stations selected by a central station flexibly.

MODE OF THE INVENTION

Figure 1:
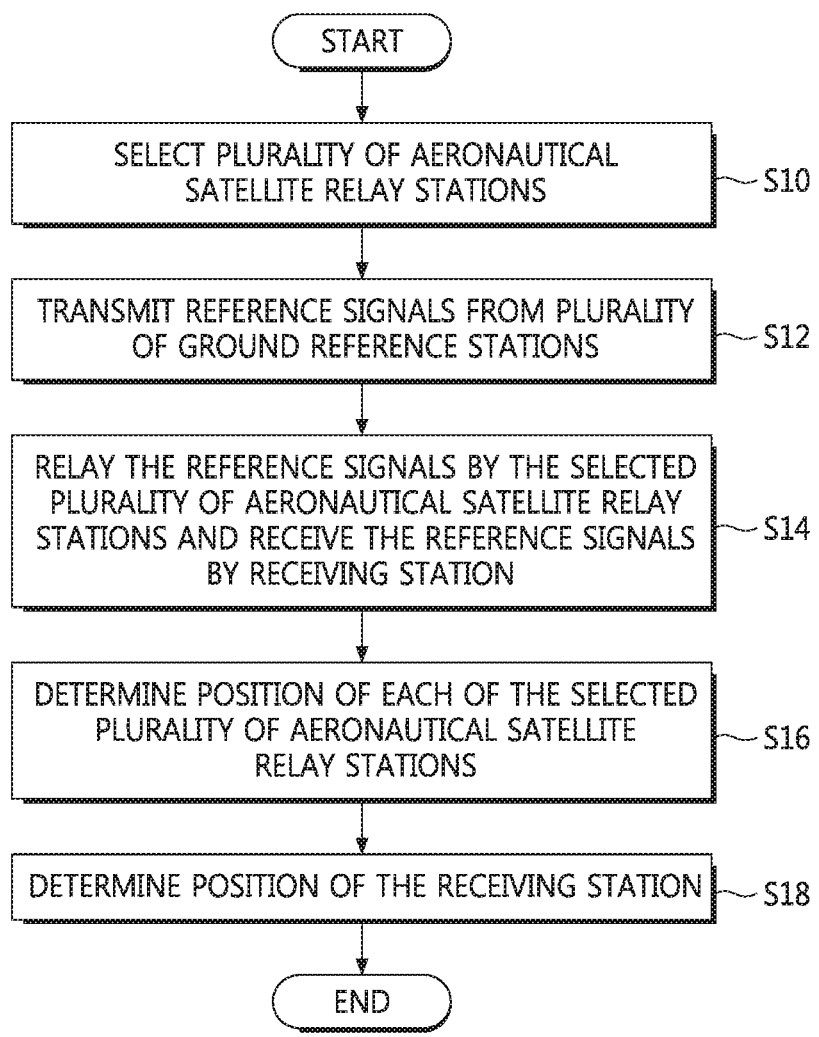
FIG. 1 is a flowchart of a positioning method based on a time division multiple access frame, according to an embodiment of the present invention.

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, each processes may be performed by hardware such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software in a system.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, example embodiments of the inventive concept will be described in detail.

Figure 2:
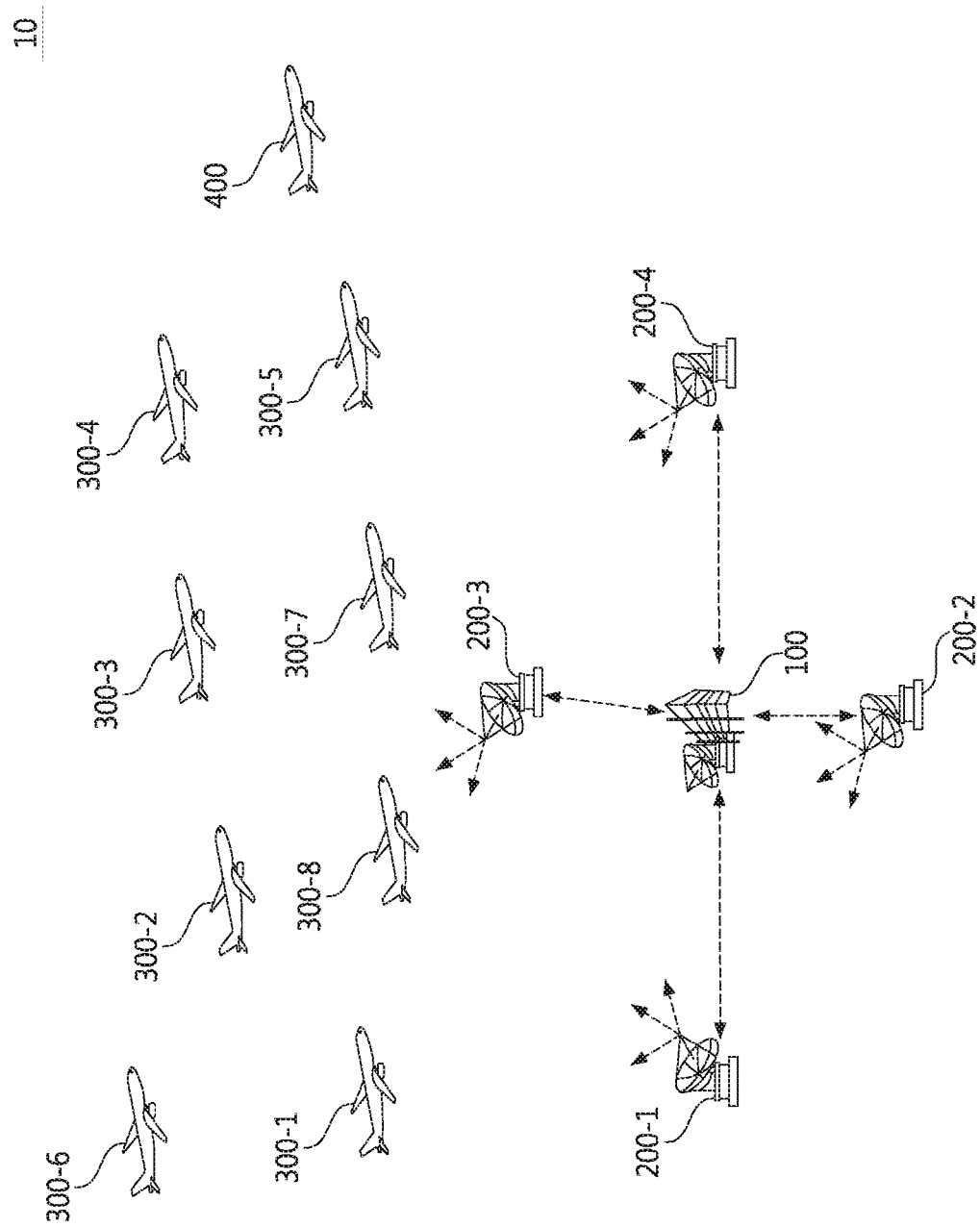
FIG. 2 is a conceptual diagram of a positioning system based on a time division multiple access frame, according to an embodiment of the present invention.
Figure 3:
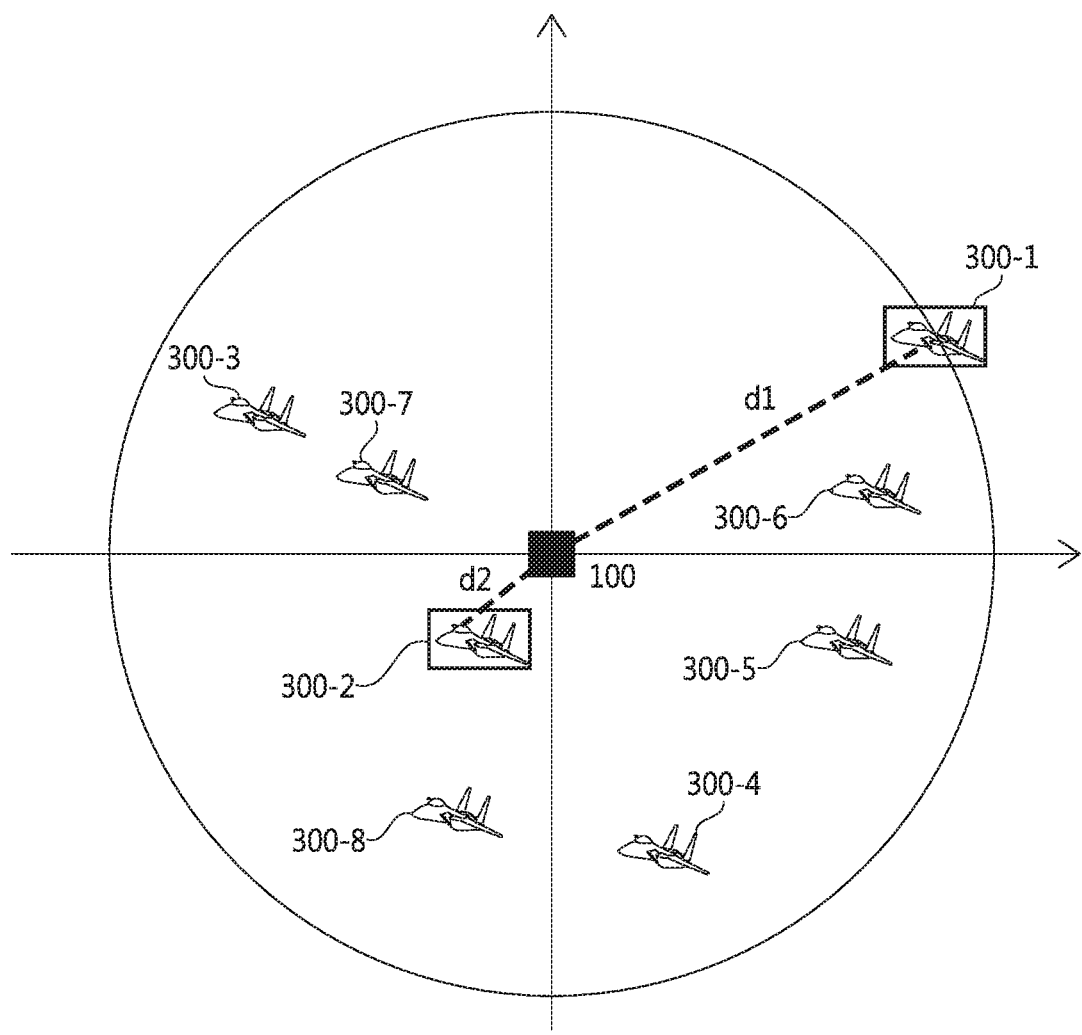
FIG. 3 is a view of a process of selecting aeronautical satellite relay stations by a reference station in FIG. 2.
Figure 4:
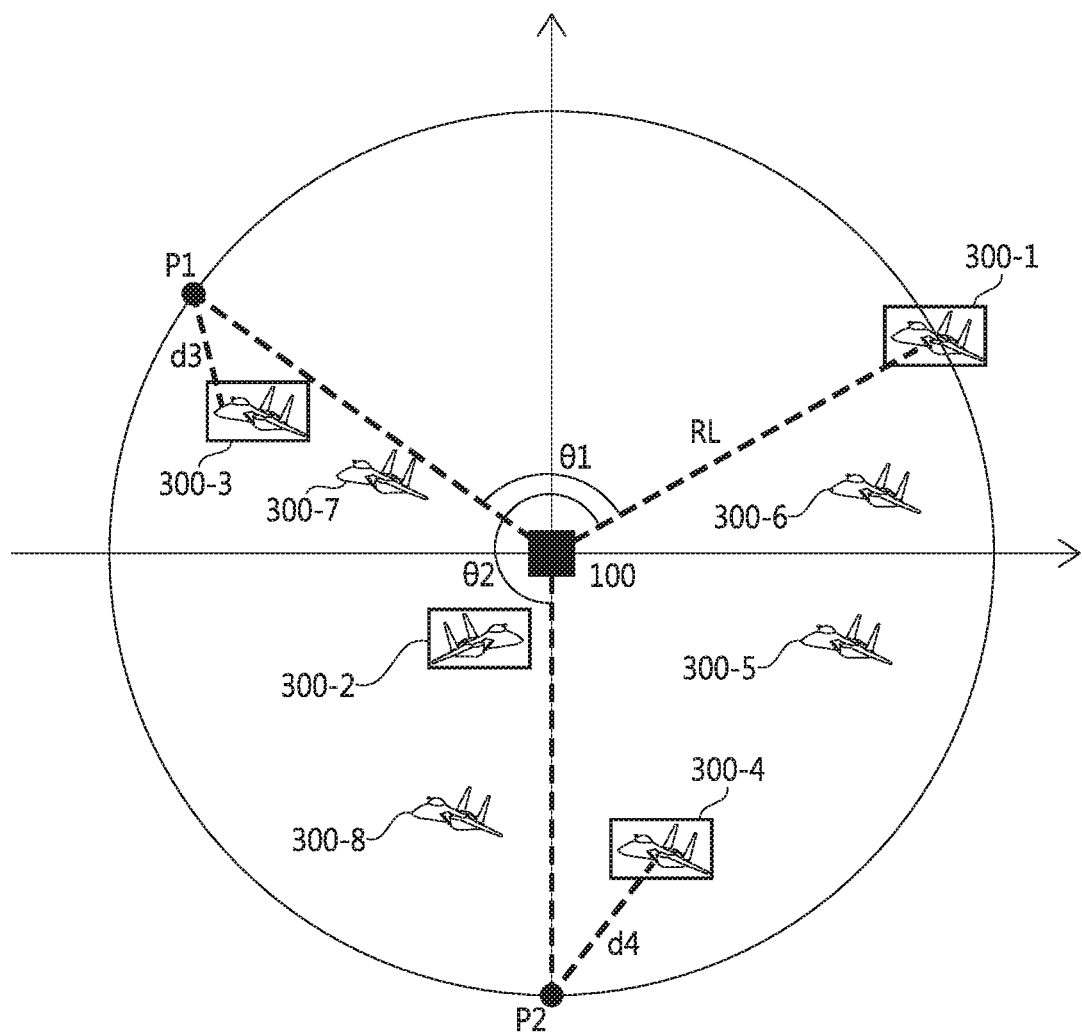
FIG. 4 is a view of a process of further selecting aeronautical satellite relay stations by a reference station in FIG. 2.
Figure 5:
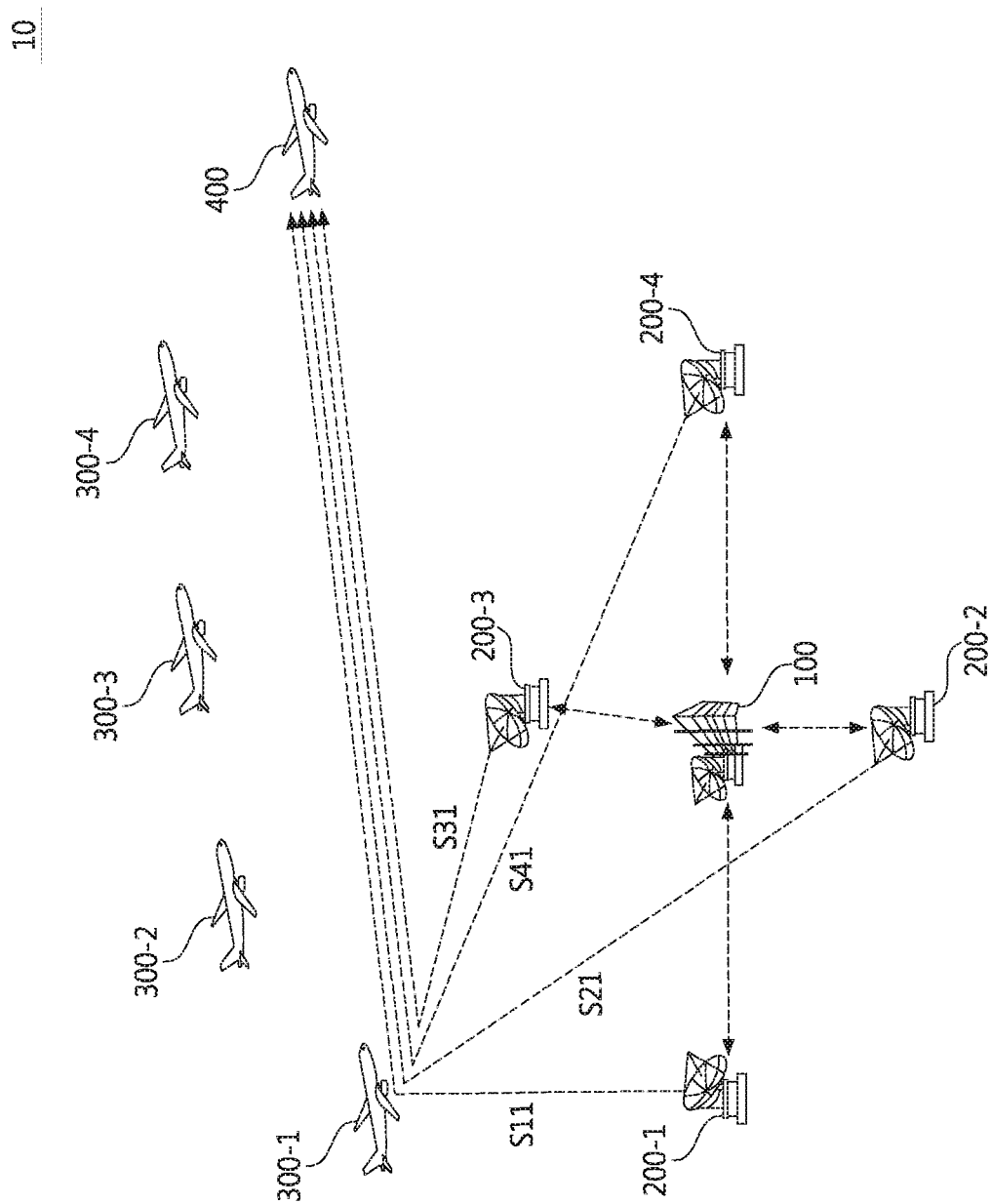
FIG. 5 is a view of a process of determining positions of aeronautical satellite relay stations in FIG. 2.
Figure 6:
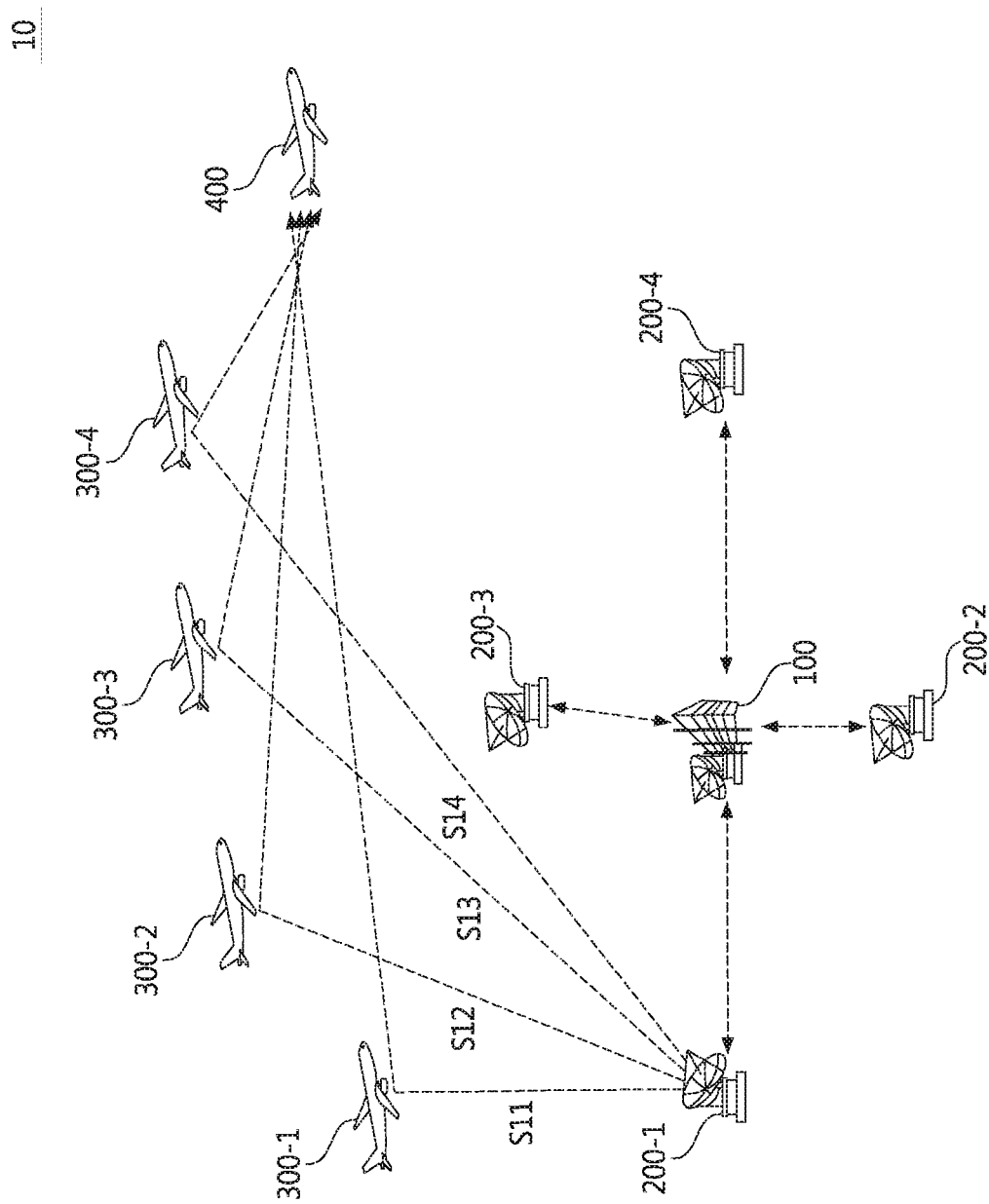
FIG. 6 is a view of a process of determining a position of a receiving station in FIG. 2.

FIG. 1 is a flowchart of a positioning method based on a time division multiple access frame, according to an embodiment of the present invention. FIG. 2 is a conceptual diagram of a positioning system based on a time division multiple access frame, according to an embodiment of the present invention. FIG. 3 is a view of a process of selecting aeronautical satellite relay stations by a reference station in FIG. 2. FIG. 4 is a view of a process of further selecting aeronautical satellite relay stations by a reference station in FIG. 2. FIG. 5 is a view of a process of determining positions of aeronautical satellite relay stations in FIG. 2. FIG. 6 is a view of a process of determining a position of a receiving station in FIG. 2.

Referring to FIGS. 1 and 2, a positioning system 10 based on a time division multiple access frame may include a central station 100, a plurality of ground reference stations 200-1 to 200-4, a plurality of aeronautical satellite relay stations 300-1 to 300-8, and a receiving station 400.

According to an embodiment, the positioning system 10 may be applied for positioning in a military network. However, the embodiment is not limited thereto. The positioning system 10 may be implemented as a positioning system in a network for various purposes.

The central station 100 may manage and control operations of the positioning system 10. In particular, the central station 100 may select aeronautical satellite relay stations (e.g., 300-1 to 300-4) to be used for positioning from among the plurality of aeronautical satellite relay station candidates 300-1 to 300-8, and may share information about the selected aeronautical satellite relay stations (e.g., 300-1 to 300-4) with the ground reference stations 200-1 to 200-4.

The plurality of ground reference stations 200-1 to 200-4 are reference points for positioning. Information about positions of the ground reference stations 200-1 to 200-4 is stored in advance in the central station 100.

The plurality of aeronautical satellite relay station candidates 300-1 to 300-8 are devices spaced apart from the ground and capable of relaying signals. For example, the plurality of aeronautical satellite relay station candidates 300-1 to 300-8 may be implemented as geostationary communication satellites, satellites with forwarding/communication capabilities, or aircrafts with forwarding/communication capabilities.

The receiving station 400 is a device to be positioned, and is shown as being spaced apart from the ground in FIG. 2, but a position of the receiving station 400 is not limited thereto and may be implemented as a moving object on the ground.

In operation S10, the central station 100 may select a plurality of aeronautical satellite relay stations (e.g., 300-1 to 300-4) for relaying reference signals transmitted from the plurality of ground reference stations 200-1 to 200-4 from among the plurality of aeronautical satellite relay station candidates 300-1 to 300-8.

Operation S10 will be described in more detail with reference to FIGS. 3 and 4.

Referring to FIGS. 2 and 3, in order to calculate a horizontal distance between the central station 100 and the plurality of aeronautical satellite relay station candidates 300-1 to 300-8 as shown in FIG. 2, the central station 100 and the plurality of aeronautical satellite relay station candidates 300-1 to 300-8 may be displayed on a two-dimensional (2D) plane.

The central station 100 may select aeronautical satellite relay stations (e.g., 300-1 and 300-2) for relaying reference signals based on the horizontal distance between the central station 100 and each of the plurality of aeronautical satellite relay station candidates 300-1 to 300-8.

According to an embodiment, the central station 100 may select the first aeronautical satellite relay station 300-1 having a longest horizontal distance d1 from the central station 100 and the second aeronautical satellite relay station 300-2 having a shortest horizontal distance d2 from the central station 100 from among the plurality of aeronautical satellite relay station candidates 300-1 to 300-8.

The central station 100 may further select aeronautical satellite relay stations in addition to the first aeronautical satellite relay station 300-1 and the second aeronautical satellite relay station 300-2.

Referring to FIGS. 2 to 4, the central station 100 may further select aeronautical satellite relay stations (e.g., 300-3 and 300-4) with reference to reference points P1 and P2 having angles that are integral multiples (e.g., θ2 is twice as great as a reference angle (θ1)) of the reference angle (θ1) from a reference line RL formed by the first aeronautical satellite relay station 300-1 and the central station 100.

According to an embodiment, the central station 100 may select the aeronautical satellite relay station 300-3 having a shortest distance d3 from the first reference point P1 and the aeronautical satellite relay station 300-4 having a shortest horizontal distance d4 from the second reference point P2 as aeronautical satellite relay stations for relay.

Referring again to FIGS. 1 and 2, in operation S12, the plurality of ground reference stations 200-1 to 200-4 may transmit reference signals to a plurality of aeronautical satellite relay stations (e.g., 300-1 to 300-4) selected by the central station 100, respectively.

In operation S14, the reference signals transmitted from the plurality of ground reference stations 200-1 to 200-4 are relayed by the plurality of aeronautical satellite relay stations 300-1 to 300-4 and received by the receiving station 400.

First, in operation S16, the receiving station 400 may determine a position of each of the plurality of aeronautical satellite relay stations 300-1 to 300-4 using a time difference of the received reference signals.

Operation S16 will be described in detail with reference to FIG. 5.

The receiving station 400 may receive reference signals S11, 521, 531, and S41 that are transmitted from the plurality of ground reference stations 200-1 to 200-4 and relayed by the first aeronautical satellite relay station 300-1 and may determine a position of the first aeronautical satellite relay station 300-1 using a time difference of arrival (TDOA) of the received reference signals S11, 521, 531, and S41.

In the same manner as the first aeronautical satellite relay station 300-1, the receiving station 400 may determine positions of the aeronautical satellite relay stations 300-1 to 300-4.

Next, in operation S18, the receiving station 400 may determine its position based on the position of each of the aeronautical satellite relay stations 300-1 to 300-4 determined in operation S16 and arrival times of the received reference signals.

Operation S18 will be described in detail with reference to FIG. 6.

The receiving station 400 may receive the reference signals S11, S12, S13, and S14 that are transmitted from a ground reference station (e.g., 200-1) and relayed by the plurality of aeronautical satellite relay stations 300-1 to 300-4 and may determine the position of the receiving station 400 using a time of arrival (TOA) of the received reference signals S11, 521, 531, and S41.

Figure 7:
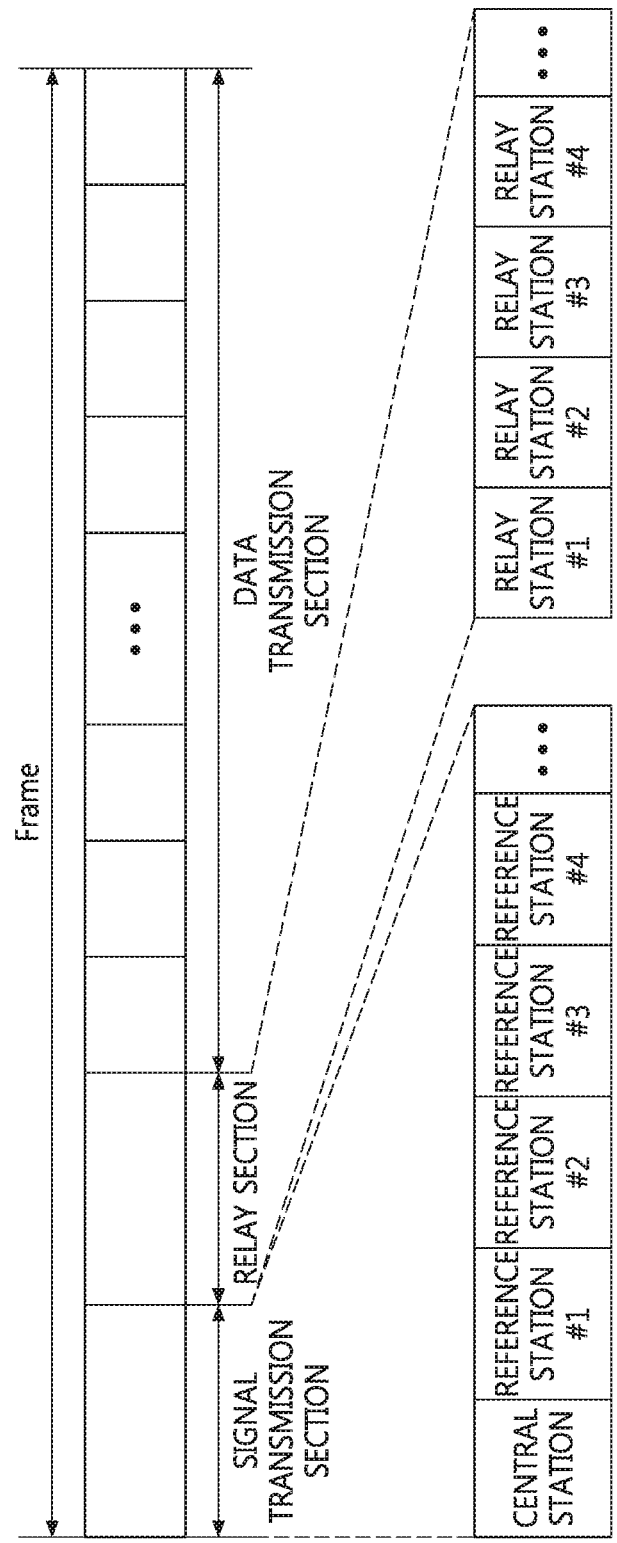
FIG. 7 is a view of a time division multiple access frame structure according to an embodiment of the present invention.

FIG. 7 is a view of a time division multiple access frame structure according to an embodiment of the present invention.

Referring to FIGS. 1, 2, and 7, the frame according to the embodiment of the present invention may include a signal transmission section, a relay section, and a data transmission section.

The signal transmission section is allocated for transmitting reference signals from the plurality of ground reference stations 200-1 to 200-4, the relay section is allocated for relaying the reference signals by a plurality of aeronautical satellite relay stations (e.g., 300-1 to 300-4) selected by the central station 100, and the data transmission section is allocated for transmitting data to the central station 100, the plurality of ground reference stations 200-1 to 200-4, the plurality of aeronautical satellite relay stations (e.g., 300-1 to 300-4), or all nodes (not shown) subscribed to other networks.

The signal transmission section, the relay section, and the data transmission section may be time division multiplexed with each other.

According to an embodiment, each of the signal transmission section, the relay section, the data transmission section may include detailed slots for efficient allocation of frames.

The signal transmission section may include a central station slot for transmitting information about a plurality of aeronautical satellite relay stations (e.g., 300-1 to 300-4) selected by the central station 100 to the ground reference stations 200-1 to 200-4 and the plurality of reference station slots respectively allocated to the plurality of ground reference stations 200-1 to 200-4 for respectively transmitting reference signals from the plurality of ground reference stations 200-1 to 200-4.

Depending on the number of ground reference stations selected by the central station 100, a size of the signal transmission section may be flexibly allocated.

The relay section may include a plurality of relay station slots respectively allocated to a plurality of aeronautical satellite relay stations (e.g., 300-1 to 300-4) selected by the central station 100 for relaying reference signals of the plurality of aeronautical satellite relay stations.

Depending on the number of aeronautical satellite relay stations selected by the central station 100, a size of the relay section may be flexibly allocated.

A method according to an embodiment of the present invention and each of operations according to the method may be implemented with an instruction or an executable code stored in a computer-readable storage medium in the form of a program module.

Examples of the computer-readable storage medium may include hard disks, floppy disks, magnetic media (e.g., magnetic tapes), optical media (e.g., compact disc-read only memory (CD-ROM), a digital versatile disc (DVD), or magneto-optical media (e.g., floptical disks)), or hardware devices (e.g., read only memory (ROM), random access memory (RAM), or a flash memory).

In the method according to an embodiment of the present invention and each of operations according to the method, some operations may be executed in a different order or omitted, or other operations may be added.

Hereinabove, the present invention has been described with reference to the preferred embodiments of the present invention. However, it will be appreciated by those skilled in the art that various modifications and changes of the present invention can be made without departing from the spirit and the scope of the inventive concept which are defined in the appended claims and their equivalents.

The invention claimed is:

1. A positioning method based on a time division multiple access frame, the positioning method comprising:
    selecting aeronautical satellite relay stations for relaying reference signals transmitted from a plurality of ground reference stations from among a plurality of aeronautical satellite relay station candidates;
    receiving reference signals that are transmitted from the ground reference stations and relayed by the selected aeronautical satellite relay stations;
    determining a position of each of the selected aeronautical satellite relay stations using a time difference of the received reference signals; and
    determining a position of a receiving station based on the determined position of each of the aeronautical satellite relay stations and arrival times of the received reference signals,
    wherein a signal transmission section in which the reference signals are transmitted and a relay section in which the reference signals are relayed are time division multiplexed with each other to form one frame, and
    wherein the selecting of the aeronautical satellite relay stations comprises:
    selecting a first aeronautical satellite relay station having a longest horizontal distance from a central station and a second aeronautical satellite relay station having a shortest horizontal distance from the central station from among the plurality of aeronautical satellite relay station candidates.

2. The positioning method of claim 1, the signal transmission section comprises:
    a central station slot for transmitting information about the plurality of aeronautical satellite relay stations selected by the central station to the ground reference stations; and
    a plurality of reference station slots respectively allocated to the plurality of ground reference stations for respectively transmitting reference signals from the plurality of ground reference stations.

3. The positioning method of claim 1, the relay section comprises:
    a plurality of relay station slots respectively allocated to the plurality of aeronautical satellite relay stations selected by the central station for relaying reference signals of the plurality of aeronautical satellite relay stations.

4. The positioning method of claim 1, the selecting of the aeronautical satellite relay stations further comprises:
    selecting aeronautical satellite relay stations with reference to reference points having angles that are integral multiples of a reference angle from a reference line formed by the first aeronautical satellite relay station and the central station.

5. A positioning system based on a time division multiple access frame, the positioning system comprising:
    a plurality of ground reference stations respectively transmitting reference signals;

a plurality of aeronautical satellite relay stations for relaying the reference signals transmitted from the plurality of ground reference stations;

a central station for selecting the plurality of aeronautical satellite relay stations for relaying signals from among a plurality of aeronautical satellite relay station candidates; and a receiving station for determining a position of each of the aeronautical satellite relay stations using a time difference of the reference signals that are relayed by the aeronautical satellite relay stations and received, and determining a position of the receiving station based on the determined position of each of the aeronautical satellite relay stations and arrival times of the received reference signals, wherein a signal transmission section in which the reference signals are transmitted and a relay section in which the reference signals are relayed are time division multiplexed with each other to form one frame, and wherein the central station is configured to select a first aeronautical satellite relay station having a longest horizontal distance from the central station and a second aeronautical satellite relay station having a shortest horizontal distance from the central station from among the plurality of aeronautical satellite relay station candidates.

6. The positioning system of claim 5, wherein the signal transmission section comprises:

a central station slot for transmitting information about the aeronautical satellite relay stations to the plurality of ground reference stations; and a plurality of reference station slots respectively allocated to the plurality of ground reference stations for respectively transmitting reference signals from the plurality of ground reference stations.

7. The positioning system of claim 5, wherein the relay section comprises:

a plurality of relay station slots respectively allocated to the aeronautical satellite relay stations for relaying reference signals of the plurality of the aeronautical satellite relay stations.

8. The positioning system of claim 5, wherein the central station is configured to further select aeronautical satellite relay stations with reference to reference points having angles that are integral multiples of a reference angle from a reference line formed by the first aeronautical satellite relay station and the central station.

* * * * *